J. BININGER.
Apparatus for Ripening Coffee.
No. 232,589.  Patented Sept. 28, 1880.
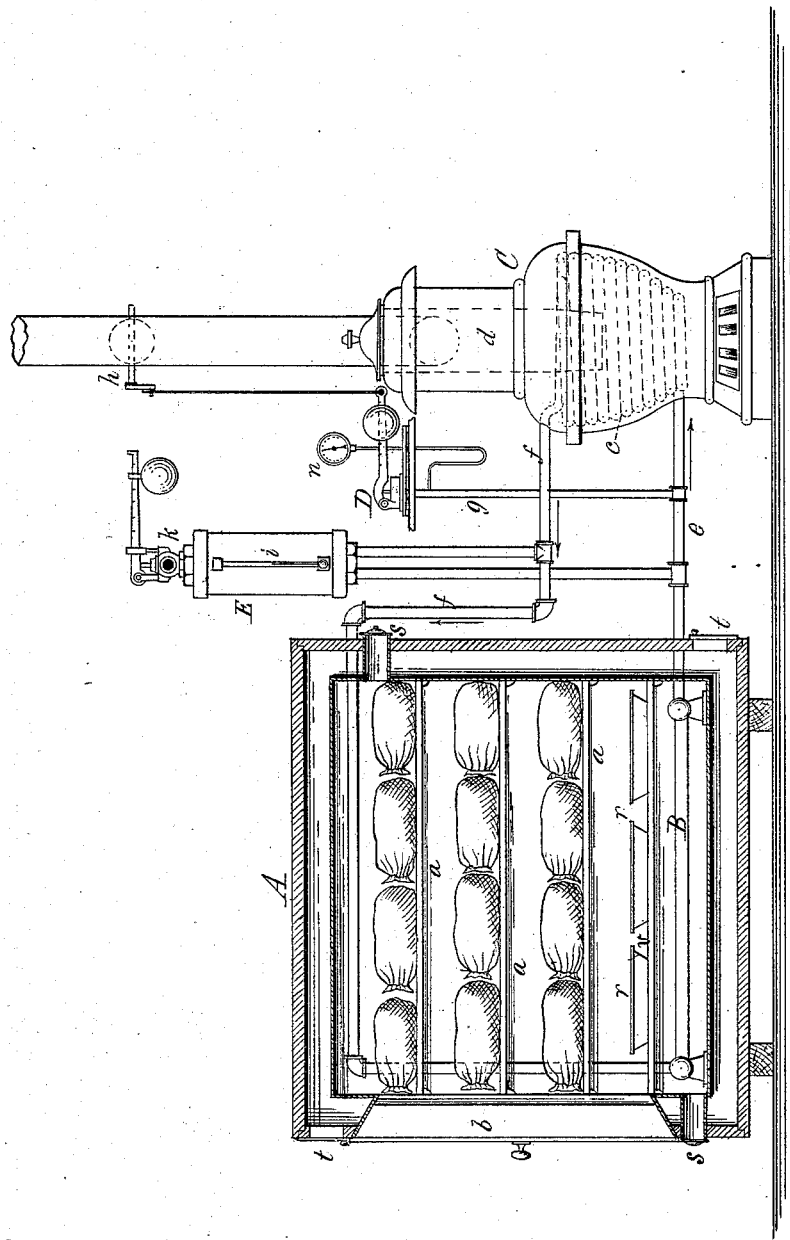

UNITED STATES PATENT OFFICE.

JACOB BININGER, OF NEW YORK, N. Y.

APPARATUS FOR RIPENING COFFEE.

SPECIFICATION forming part of Letters Patent No. 232,589, dated September 28, 1880.

Application filed September 19, 1879.

*To all whom it may concern:*

Be it known that I, JACOB BININGER, of New York city, have invented a new and Improved Apparatus for Ripening Coffee, of which the following is a specification.

My invention aims to provide a new and improved apparatus for ripening or maturing and browning green or raw coffee in lieu of steaming, heretofore employed; and my invention may be briefly stated to consist in treating the coffee within an inclosing-chamber by the action of hot moist air at a moderate temperature, produced by radiation and evaporation within the chamber, and also in the apparatus employed to effect this, as hereinafter set forth.

The annexed drawing presents my complete apparatus in elevation, the chamber in which the coffee is treated being shown in section.

As is well known, coffee which arrives in port on a shorter voyage than usual generally requires to be treated so as to produce artificially the same condition of ripeness which age or a long voyage effects. For this purpose it has been usual heretofore to place the coffee in bags or bulk within a close chamber into which live steam is blown from a steam-boiler, which effects the ripening of the coffee in a comparatively short time. The objections which I find to apply to this method are that the action of the steam is too violent on the coffee-berry, and its temperature and moisture are too great, so that it does not sufficiently approach the maturing action of age. Furthermore, the coffee by this system becomes wet by the steam, and the application of the heat in this way is quite wasteful, and, moreover, requires the expensive attendance of an engineer to manage the boiler.

My invention therefore aims to overcome these objections by producing an apparatus which shall apply its heat with economy and be automatic in its action, requiring little or no attention but to supply the same with fuel; and, furthermore, shall closely imitate the maturing process of nature by submitting the coffee to the gentle and continued action of an atmosphere of hot moist air heated by radiation and moistened by evaporation within the chamber in which the coffee is inclosed.

In the drawings, A indicates the chamber in which the coffee is placed for treatment. This chamber is preferably formed with double walls with a non-conducting air-space between them, the inner wall being preferably of sheet metal or other good radiating material, while the outer wall is preferably of wood or other good non-conducting material.

The coffee may be placed in the chamber in bulk, but it is preferably placed therein in bags, as illustrated, and racks or shelves *a a* are accordingly placed across the chamber at suitable intervals to support the same. These racks may be formed of wooden slats or of cord or wire nettings, cord netting being preferable. The chamber is also provided with a door, *b*, passing through both walls, by which access may be had to the chamber for filling or emptying the same, and this door is so formed that it may be closed air-tight, and the entire chamber is also so made that all its apertures may be shut tight to completely inclose its contents and confine the heat and moisture therein.

A coil or system of heating-pipes, B, is arranged in the bottom of the chamber, and may be supplied with steam to furnish radiated heat to the interior of the apparatus; but it is preferably supplied with a circulating column of hot water from the automatic heating and regulating apparatus on the right. In this apparatus, C indicates the heater or furnace, for which I prefer to use an ordinary magazine-stove of large size. In the fire-chamber of this stove is placed a conical heating-coil, *c*, so as to form the outer wall of the fire-chamber, while the magazine *d* of the stove projects down within the coil and may be charged with sufficient fuel to continue the action of the apparatus for a long time without attention.

The terminals of the coil of the stove and of the coil of the tank are connected with each other by the pipes *e f*, in the usual manner of a circulating water-coil, so as to produce a constant energetic circulation of highly-heated water through the same.

D indicates a damper-regulator, the lever of which connects with the damper *h* in the flue of the stove, as illustrated, while the diaphragm-chamber thereof is connected by pipe *g* with one branch of the circulating-coils, so that by adjusting the weight on the lever of the regulator to the desired pressure the lever will become raised and the damper closed when this pressure is exceeded, thus shutting off the draft from the stove and causing the pressure to fall to the desired point, thus automatically maintaining the pressure, and consequently the temperature of the water in the circulating-coil, at the desired uniform degree.

E is a safety and expansion chamber elevated above the circulating-coils and connected with both branches thereof, and also provided with a water-gage, $i$, and safety-valve $k$. The high-pressure steam that may arise from the water accumulates in this chamber and forms an elastic pressure upon the circulating water in the coils. The amount of steam is shown by the gage $i$, which also indicates the level of the water, which constantly oscillates, owing to the greater or less generation of steam from the highly-heated water. The safety-valve $k$ allows this steam or water to escape should any sudden pressure be generated in the coils by any chance. A steam-gage at $n$ constantly indicates the exact pressure in the coils.

Above the heating-coil B, within the chamber A, a rack or shelf is arranged, on which several evaporating-pans, $r$, containing water, are placed, the evaporation of which by the heat of the chamber moistens the warm air of the chamber. The degree of moisture may be regulated by increasing or decreasing the number of pans, and through a window in the door or wall of the chamber the moisture and temperature of the air may be known by the indications of a hygrometer and thermometer within the chamber, as will be readily understood. The temperature is regulated by the pressure in the circulating-coils, which may be controlled by adjusting the weight on the damper-regulator to the desired point.

Passages $s$ $s$ extend from the outside of the chamber through both walls thereof into the interior at the top and bottom and opposite sides of the chamber, as shown, and the mouths thereof are provided with covers or registers, by opening which a circulation of external air will be produced through the chamber, which will serve to reduce the moisture or temperature thereof should either become too high, or will serve to cool down the interior after the process is complete. Hinged or movable flaps or shutters $t$ $t$ at diagonally-opposite points on the outer walls of the chamber may also be opened to allow a circulation of air between the walls of the chamber when the same is to be cooled down preparatory to moving the contents.

The duration of the treatment by this process may vary from two days to one week and the temperature from 120° to 200° Fahrenheit, or thereabout, according to the condition and requirements of the coffee, which vary considerably. To therefore regulate the action of the apparatus according to requirements, a loose sample of the coffee undergoing the treatment is placed in convenient position, where it may be seen from the window of the chamber, or removed for inspection, so that the progress of the treatment may thus be known and controlled from this sample.

It will now be observed that by this process the coffee is inclosed in an atmosphere of hot air charged with moisture to its point of saturation, or thereabout, and hence the natural conditions of ripening, or the conditions which exist in the hold of a ship on a long voyage, are more nearly imitated; and as the heat is produced by radiation and the moisture by evaporation within the chamber, the heating effect is very economical, and the moisture cannot rise above the point of saturation, so that there is no danger of condensation on the coffee, thus avoiding excessive moistening of the coffee, which is objectionable. The coffee therefore emerges from this treatment in a dry firm condition with a ripe color, flavor, and quality, which fit it for direct use and greatly increase its marketable value.

The heating portion of the apparatus has the great advantage of being entirely automatic in its action, and consumes but a very small amount of fuel, thus utilizing the heat with the greatest economy.

The action of the damper-regulator is found to maintain the pressure and temperature in the circulating-coil uniform with perfect certainty and safety, so that the apparatus requires no attention but to refill the magazine of the stove and rake the fire occasionally.

When the apparatus is to be left in action over night it is only necessary to place the weight well forward on the damper-regulator, when the apparatus will be maintained in a low state of action without requiring any attention whatever during the night.

It will thus be seen that my invention presents many advantages in economy and convenience over former methods, and forms a material improvement in the art of treating coffee.

I am aware that it has been proposed to ripen fruit by means of steam and the heat from burning gas-jets; but in the case referred to the gas-jets and the boiler from which the steam is raised are both contained in the chamber in which the fruit is to be placed, and the two are in such proximity to each other that it is the steam from the boiler rather than the heat from the gas that acts on the fruit. Heat obtained from gas burned in the same chamber with the coffee would, however, be decidedly objectionable, as the gases caused by the burning of ordinary illuminating-gas would have a deleterious effect on the coffee, and the steam would have the effects heretofore referred to. This system, therefore, is not an anticipation of my idea, because by my method of supplying the moisture the air can never become saturated beyond the desired degree, thus obviating the excessive moistening caused by steam supplied by the action of heat applied direct to the vessel in which the steam is generated. By my method of operating steam cannot be formed, as the heated air is not allowed to become hot enough to boil water, and therefore does not raise steam, but simply takes up such vapor as may incidentally rise from the water, and by this means all danger of over-moistening the coffee is avoided.

From the above description it will be seen that my apparatus is so arranged that the parts with which the water contained in the pans in the chamber A comes in contact are never at such a temperature as to heat the water to 212°, and although a vapor is formed they are incapable of generating steam, as that word is generally understood, because ordinary steam requires water to be heated to 212° before it is formed, and requires that the substance imparting the heat shall reach a much higher temperature, whereas in my apparatus the water comes in contact with nothing heated above 200°. I therefore, to distinctly point out the difference between my invention and others, state that in all other apparatus of this class with which I am acquainted steam generated from water raised to 212° or over is used, while in my case no steam, properly so called, is employed, but simply such moisture as will be taken up by air heated below the boiling-point of water.

I am also aware that a tobacco-drier has been made consisting of a room containing furnaces having flues, with an evaporating-vessel resting on said flues, so that the heated flues, acting on the bottom of the vessel, would heat the water and raise steam, and that it has further been proposed to raise such vessel above the flues and to drop water from the vessel upon them, and by this means raise steam; but both of these plans would be objectionable for my purpose, because steam in considerable quantities is liable to be raised by either mode, instead of the simple moistening of the heated air by its contact with the water, as in my case, and the effect of such an apparatus, if used to treat coffee, would be the same as heretofore referred to in other cases where steam is employed.

I am also aware that it has been proposed to cool the air-chamber surrounding an oven by means of openings near the bottom; but there is no chance for the rapid circulation of the air in this case, as there is in mine.

What I claim as my invention is—

1. An improved automatic apparatus for treating coffee, consisting of the close chamber A, the circulating water-coils B c, and damper-regulator D, connected, by means substantially as described, with said heater and with the damper, the whole arranged and adapted to operate substantially as specified.

2. In a coffee-treating apparatus, the double-walled inclosing-chamber A, having its outer walls provided with doors or flaps t t, arranged at diagonal corners, and adapted, as set forth, to admit a cooling air-circulation between the said walls, substantially as shown and described.

3. In a coffee-treating apparatus, the combination of the water-pans r r, the inclosing-chamber A, having racks or shelves a a, and a shelf, v, arranged to hold said water-pans and the water to be evaporated from contact with highly-heated metal, and the heating-coil B, whereby the air is moistened by simple evaporation of water kept below the boiling-point, substantially as described.

JACOB BININGER.

Witnesses:
CHAS. M. HIGGINS,
JOHN E. GAVIN.